United States Patent [19]
Colby

[11] Patent Number: 6,017,081
[45] Date of Patent: *Jan. 25, 2000

[54] CONVERTIBLE TRAILER

[76] Inventor: Jeffrey M. Colby, Rt. 2 Box 28, Brewster, Minn. 56119

[ * ] Notice: This patent issued on a continued prosecution application filed under 37 CFR 1.53(d), and is subject to the twenty year patent term provisions of 35 U.S.C. 154(a)(2).

[21] Appl. No.: 09/213,995

[22] Filed: Dec. 17, 1998

[51] Int. Cl.[7] .................................................. B60P 3/355
[52] U.S. Cl. .......................................... 296/173; 296/168
[58] Field of Search .................................. 296/168, 173, 296/161

[56] References Cited

U.S. PATENT DOCUMENTS

| | | | |
|---|---|---|---|
| 1,427,365 | 8/1922 | Douglas | 296/161 |
| 2,992,037 | 7/1961 | Nusbaum | 296/168 |
| 3,284,128 | 11/1966 | Alarie | 296/173 |
| 3,458,231 | 7/1969 | Glass | 296/173 |
| 4,841,897 | 6/1989 | Claflin | 296/168 |

*Primary Examiner*—Gary C. Hoge
*Attorney, Agent, or Firm*—Hugh D. Jaeger

[57] ABSTRACT

A trailer having a removable collapsible canopy, which, when uprighted, creates a shelter to be used for ice fishing, as a hunting blind, camping shelter or various other uses. The canopy automatically deploys and collapses in minutes using either a power winch or a hand winch connected to the tongue on one end and to the rear underside of the trailer on the opposite end by a cable. The tongue is pivotally secured in the central portion of the underside of the trailer. The body of the trailer is secured to the tongue with a spring loaded pin which is removed in order to upright the trailer. The tongue then acts as a support for the shelter created thereafter. The trailer can also be used as a utility trailer which incorporates its own loading ramp and support.

1 Claim, 7 Drawing Sheets

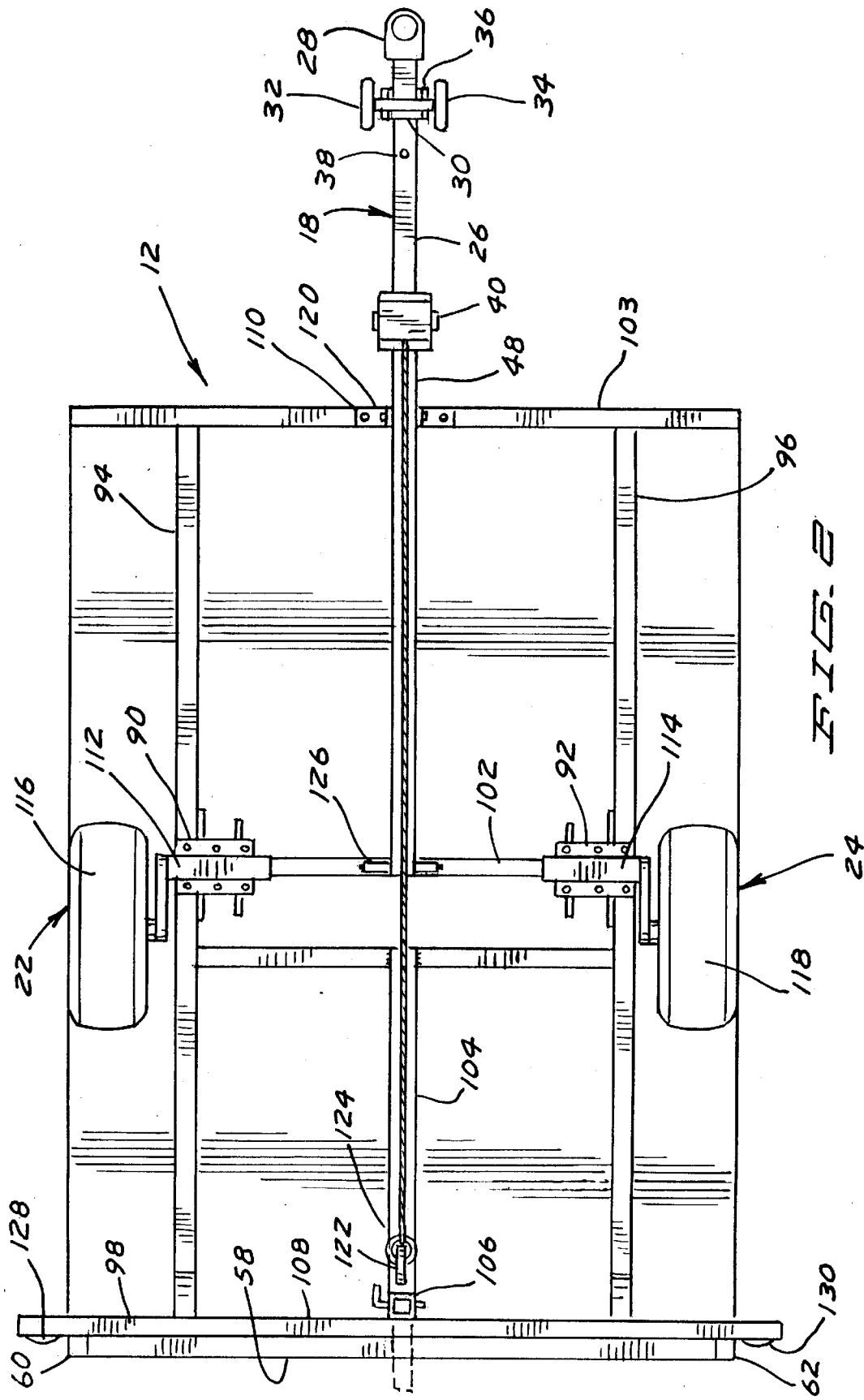

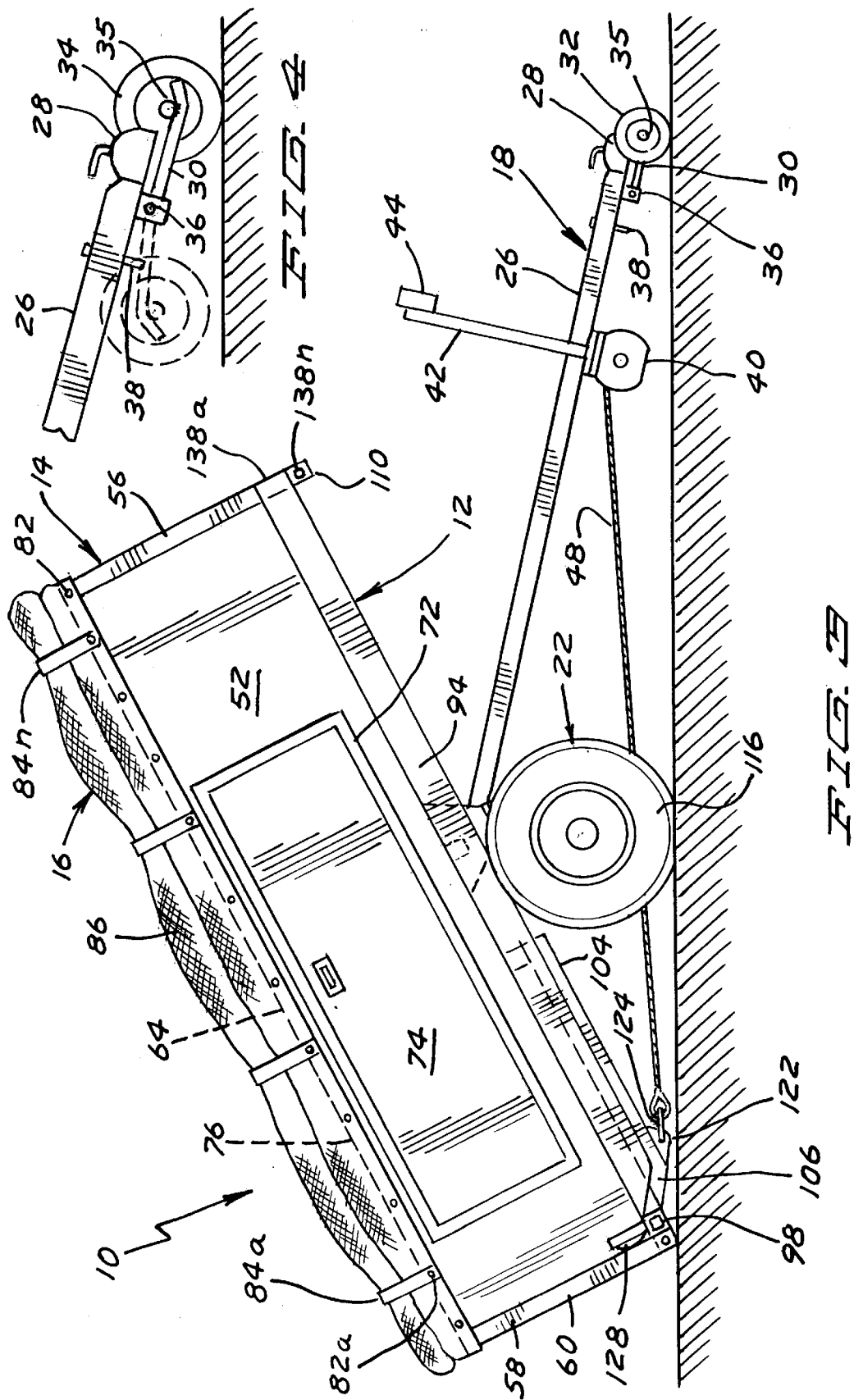

CONVERTIBLE TRAILER

CROSS REFERENCES TO CO-PENDING APPLICATIONS

None.

BACKGROUND OF THE INVENTION

1. Field of the Invention

The present invention is for a trailer, more specifically, for a utility trailer which converts quickly and easily into a shelter. When the convertible trailer is uprighted, a convertible top automatically deploys, and when the convertible trailer is lowered, the convertible top automatically collapses. The yoke of the convertible trailer acts as a support when the convertible trailer is uprighted.

The utility trailer has a built-in loading ramp and can be used to haul various things such as but not limited to golf carts, 4-wheelers, snowmobiles, motorcycles, lawn implements, and construction materials. The collapsible top can easily be removed when using the convertible trailer for hauling.

The shelter created is ideally used as a hunting blind, an ice fishing house, a camping shelter for sleeping or showering and/or a storage shelter.

2. Description of the Prior Art

The prior art does not provide for a multi-use convertible trailer with a collapsible top connected to a utility trailer which is easily set up and broken down. The prior art does not combine all the features of the present invention to create the multi-use convertible trailer later described. The scope of the present invention encompasses many different uses of the convertible trailer which are not addressed in the prior art, and eliminate the need for separate trailers, loading ramps, icehouses, hunting blinds and camping facilities.

SUMMARY OF THE INVENTION

The general purpose of the present invention is a convertible trailer which can be used as a utility trailer then easily converts to a shelter used for ice fishing, as a hunting blind, camping shelter, a portable shower facility, and storage tent.

According to one embodiment of the present invention, there is provided a steel, box tubing, framework assembly, including framework members, an oversized frame member which internally accommodates a ramp support, cross members, a hinged tongue, wheel assemblies, a ball hitch coupler, a skid plate with removable wheels, and either a power or hand winch.

There is also a body assembly which is appropriately secured atop the framework assembly. The body assembly includes a floor panel which is surrounded by two vertically oriented side panels, a vertically oriented front panel and a hinged tailgate. One of the side panels includes a door jamb and door which provides an entrance to the shelter when the canopy is deployed and side access to the trailer when the canopy is collapsed. Also included are a U-shaped tongue receiver bracket and tail lights. When the tongue pin is removed the body assembly tilts. The oversized frame member accommodates a ramp support which slides out perpendicularly to the tailgate. The tailgate pivots outwardly on lower mounted hinges and rests upon the ramp support, which adds enough strength to the tailgate to support a golf cart, 4-wheeler, snowmobile, motorcycle or like vehicle an creates its own loading ramp.

There is also provided a canopy assembly which is snappingly secured to the top edge of the body assembly. The canopy assembly includes a canopy made of canvas or like material having internally sewn sleeves which accommodate a plurality of U-shaped frame members. The U-shaped frame members are pivotally secured to the upper edge of the side panels near the tailgate. A cable extends from the winch to a hook along the underside of the convertible trailer near the tailgate. The tongue assembly is then released from the body assembly near the front of the convertible trailer by removing a spring loaded pin. The opposite end of the tongue assembly is pivotally secured to the body assembly on the underside between the two wheel assemblies by a hinge. When the winch is engaged, the convertible trailer is uprighted and the canopy assembly is automatically deployed. When the winch is disengaged, the canopy automatically collapses.

One significant aspect and feature of the present invention is a hinged tongue which can be adjusted to accommodate different height ball hitches.

Another significant aspect and feature of the present invention is a tailgate and support which doubles as a loading ramp.

Still another significant aspect and feature of the present invention is a trailer which can be adjusted to be towed by all-terrain vehicles, snowmobiles, lawn tractors, etc.

Yet another significant aspect and feature of the present invention is an automatically deployed and collapsed canopy which converts in less than two minutes.

A further significant aspect and feature of the present invention is a collapsible shelf for storage when the convertible trailer is uprighted.

A still further significant aspect and feature of the present invention is a removable canopy assembly which turns the convertible trailer into a standard utility trailer capable of holding over a ton of cargo.

Having thus described embodiments of the present invention, it is the principal object of the present invention to provide a trailer which easily converts into a shelter for ice fishing, hunting, camping or portable storage.

One object of the present invention is a trailer which utilizes its tailgate, in conjunction with an integrated ramp support, as a loading ramp.

Another object of the present invention is to provide a means to transport an ATV, or other similar vehicle, then allow the trailer to be towed by the transported vehicle.

Yet another object of the present invention is an integrated door in the body of the trailer for access to the interior when uprighted and access to the contents of the trailer when collapsed.

Still another object of the present invention is to provide either a power winch or a hand winch helps to easily convert the trailer in under two minutes.

A further object of the present invention is to provide a hunting blind capable of hauling large game long distances when the trailer is collapsed.

A still further object of the present invention is to provide a canopied shelter which automatically deploys and collapses.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2 illustrates a bottom view of the convertible trailer;

FIG. 3 illustrates a side view of the convertible trailer in an intermediate stage of conversion;

FIG. 4 illustrates a side view of the tongue with one wheel removed to show the mode of operation of the skid plate;

DETAILED DESCRIPTION OF THE PREFERRED EMBODIMENTS

Figure 1:
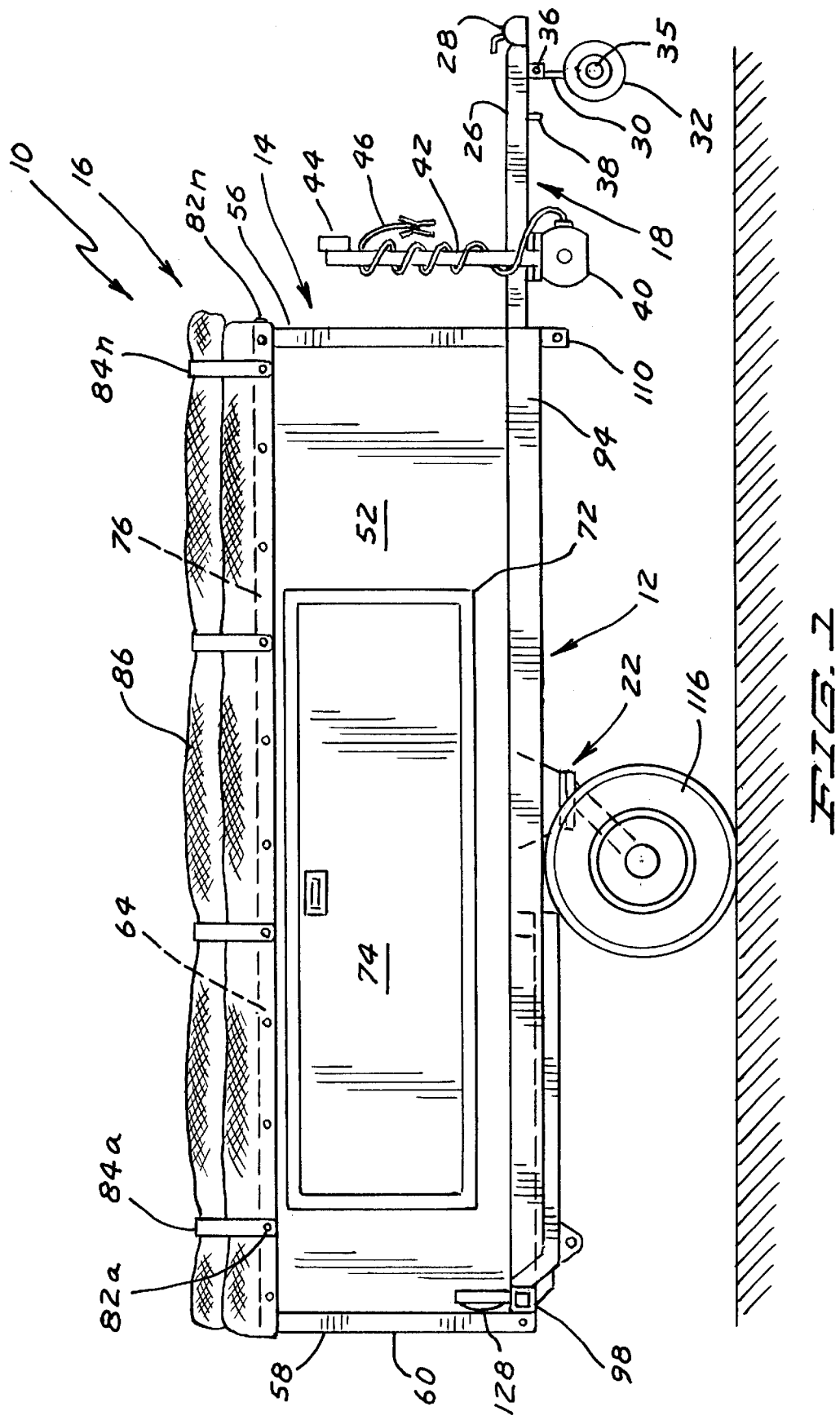
FIG. 1 illustrates a side view of the convertible trailer, the present invention, with the tongue secured to the body assembly and the canopy assembly collapsed.

FIG. 1 illustrates a side view of the convertible trailer 10, the present invention. The convertible trailer 10 is comprised of a framework assembly 12, having a body assembly 14 which is secured atop the framework assembly 12 and a canopy assembly 16 which secures to the top edge of the body assembly 14.

The frame work assembly 12 is comprised of a frame assembly 20, a tongue assembly 18 and two wheel assemblies 22 and 24 as also shown in FIG. 2 The tongue assembly 18 is comprised of a tongue 26 which is connected to the frame assembly 20 at one end and connected to a ball hitch coupler 28 at the opposite end. There is also provided a skid plate 30 which is secured to tongue 26 via hinge 36. There are also provided two opposing readily removable wheels 32 and 34 which rotatingly secured to the skid plate 30. A retention pin 38 is provided on the underside of tongue 26 which frictionally holds the skid plate 30 in a horizontal manner when in transport as shown in FIG. 2 A power winch 40 is secured to the underside of tongue 26 from which a support arm 42 extends upwardly, and secured to the top of support arm 42 is a control box 44 which controls winch 40. There is a cable 48 which is connected between the winch 40 and the frame assembly 20 which is used to raise and lower the convertible trailer 10 as further described in FIGS. 3, 5, 6 and 7 There are also provided power cables 46 which connect to a car battery, truck battery, 4-wheeler battery, snowmobile battery or other suitable battery to power winch 40. A hand winch can easily be substituted for the power winch 40 which will eliminate the need for the support arm 42, the control box 44 and the power cables 46. A hand winch also eliminates the need for a power supply, such as the previously mentioned batteries.

With reference to FIGS. 3, 5, 6, 7 and 8, the body assembly 14 is now described. The body assembly 14 is mounted to frame assembly 20 and wheel assemblies 22 and 24 can easily be removed from and reattached to the frame assembly 20 for piggy backing multiple units. The body assembly 14 is comprised of a floor panel 50, two side panels 52 and 54, a front panel 56, a tailgate 58 and two rigidifying supports 60 and 62. The tailgate 58 can be easily removed by removing two spring-loaded pins, not illustrated, at the lower portion of tailgate 58. When using the convertible trailer 10 as a utility trailer, the tailgate 58 can be replaced just as easily by re-inserting the two spring-loaded pins in the same fashion. There are also provided flanged lips 64, 66, 68 and 70 which horizontally extend outward from the top edges of side panels 52 and 54, front panel 56 and tailgate 58, respectively. Further, the flanged lips 64, 66, and 68 then extend downwardly at a 90° angle forming vertical portions 76, 78 and 80. Side panel 52 contains a horizontally aligned door jamb 72 and a horizontally aligned door 74 which acts as an entrance to the shelter when the convertible trailer 10 is uprighted. The door 74 also allows the user side access to the contents of the convertible trailer 10 when in towing position.

Figure 5:
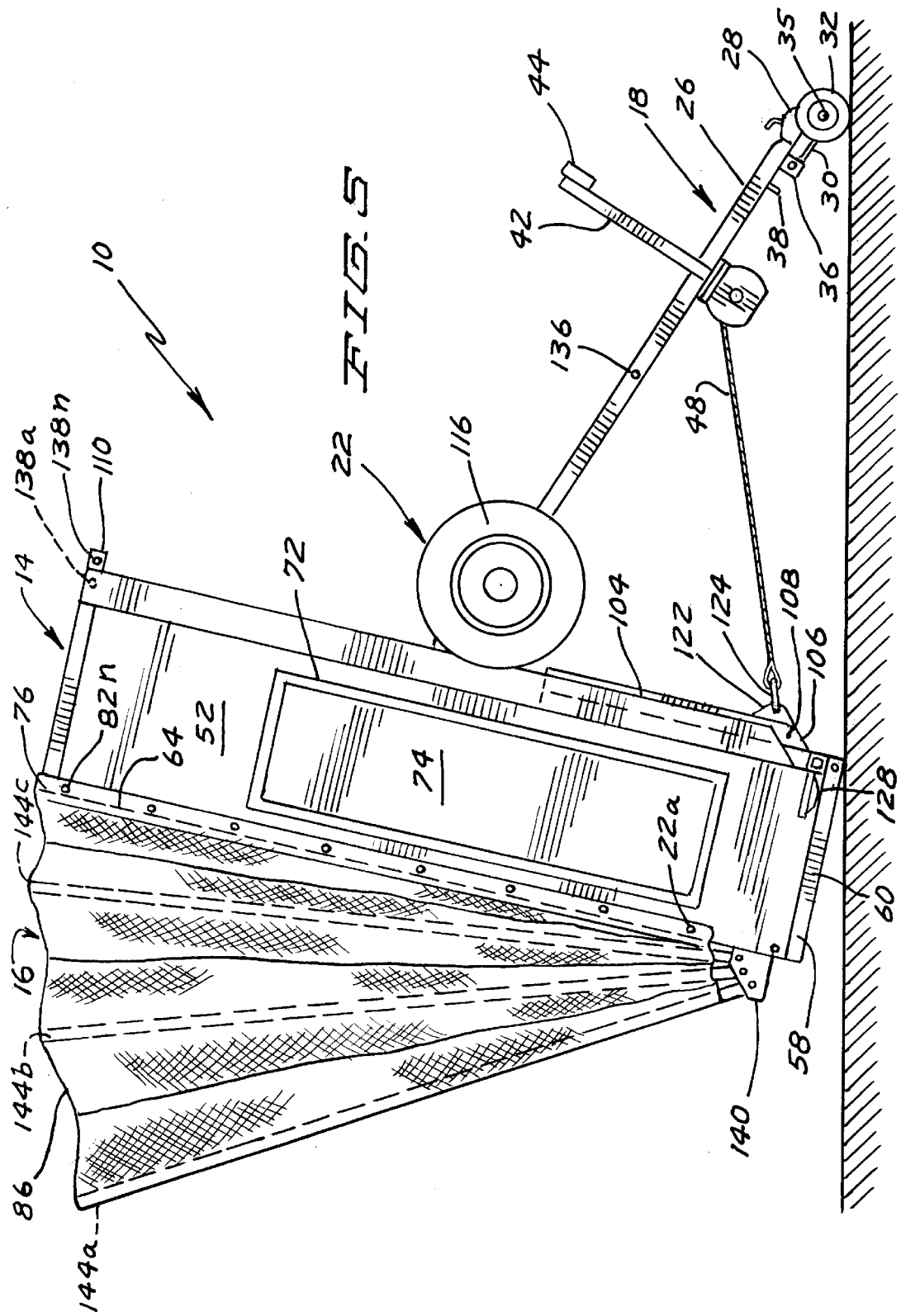
FIG. 5 illustrates a side view of the convertible trailer in an intermediate stage of conversion with the retaining straps removed.
Figure 6:
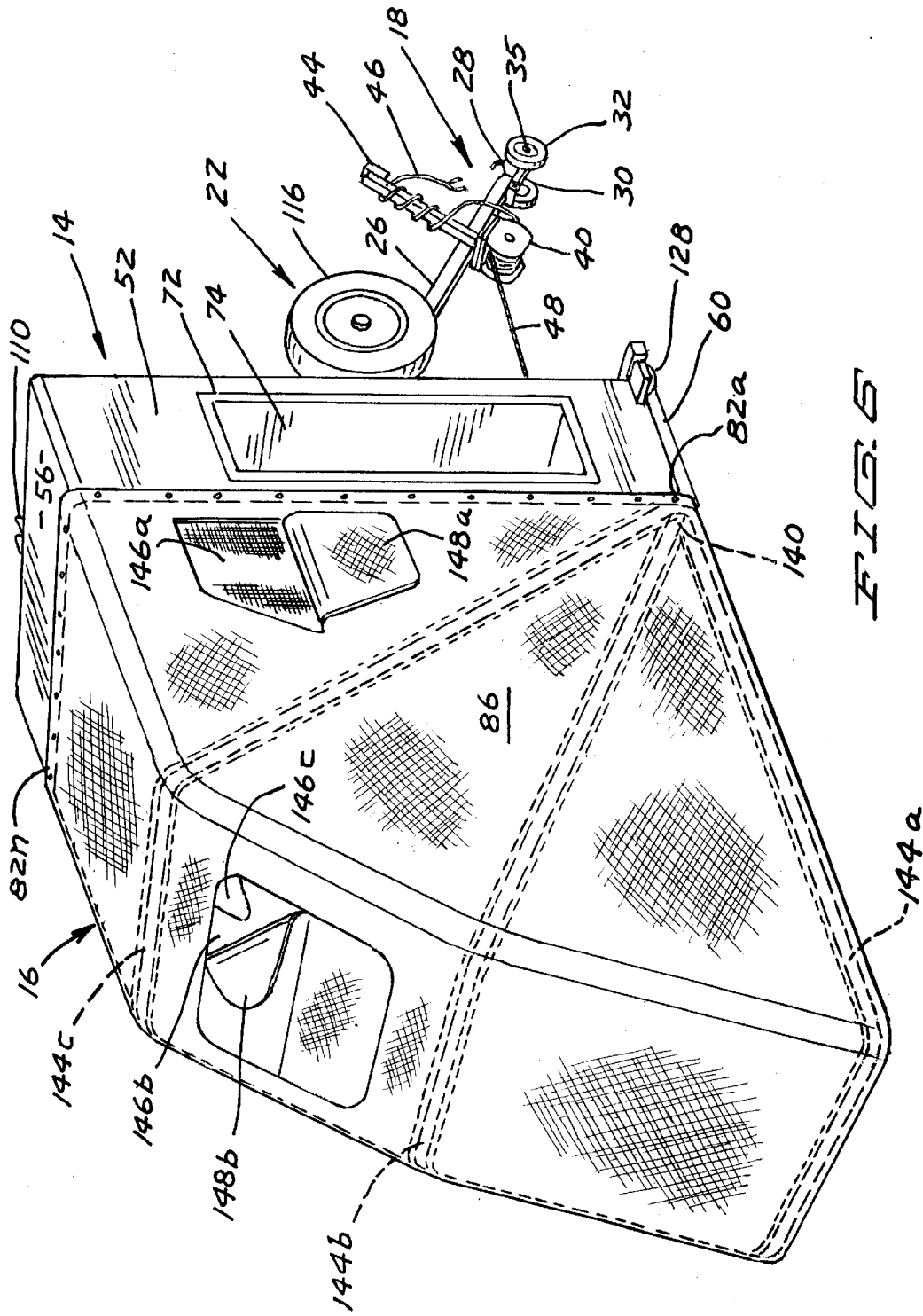
FIG. 6 illustrates a perspective view of the convertible trailer in a fully deployed position.
Figure 7:
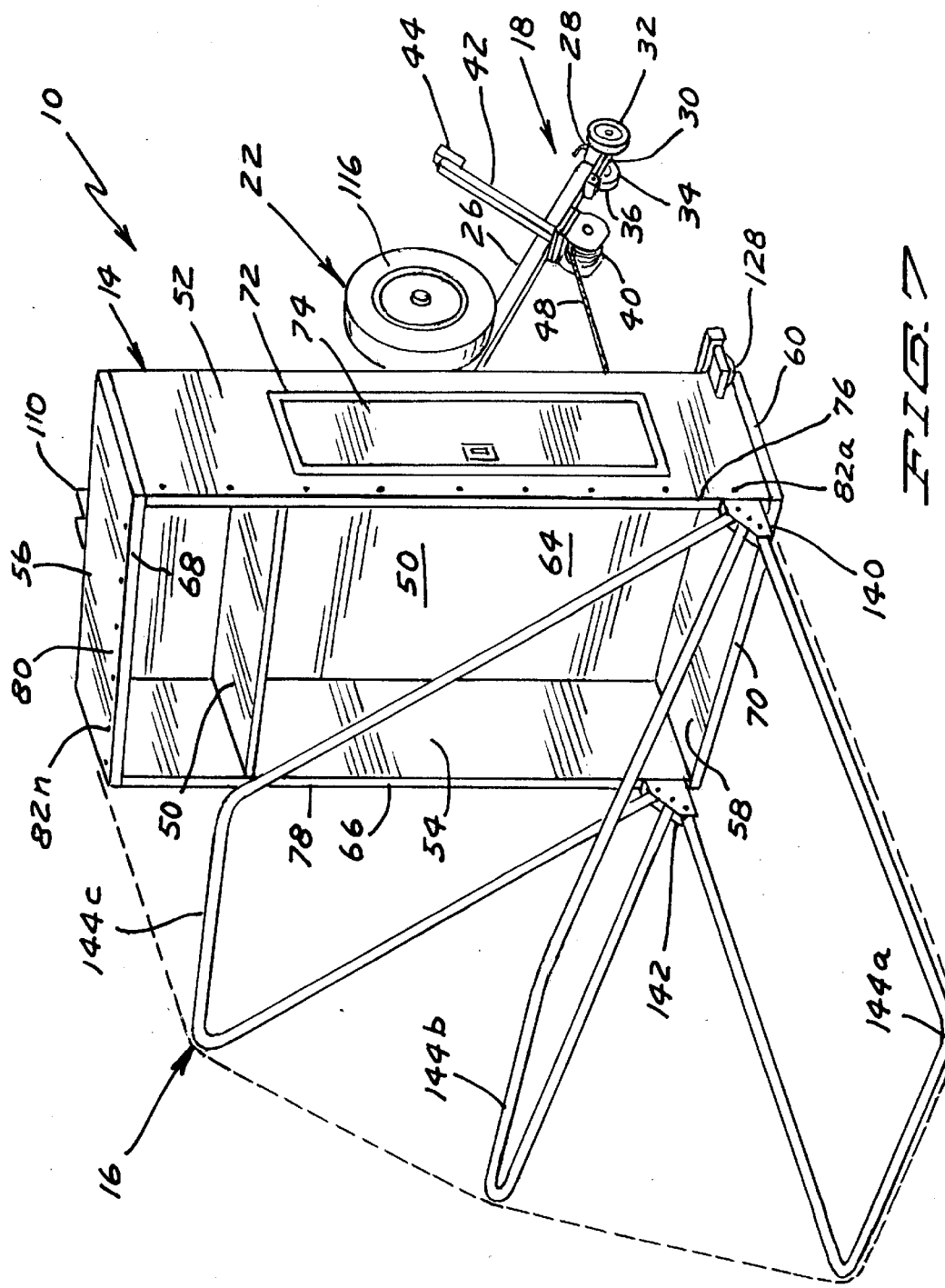
FIG. 7 illustrates a perspective view of the convertible trailer in a fully deployed position with the canopy removed; and, FIG. 8 illustrates a side view in partial cut-away with the ramp support deployed and the tailgate acting as a loading ramp.
Figure 9:
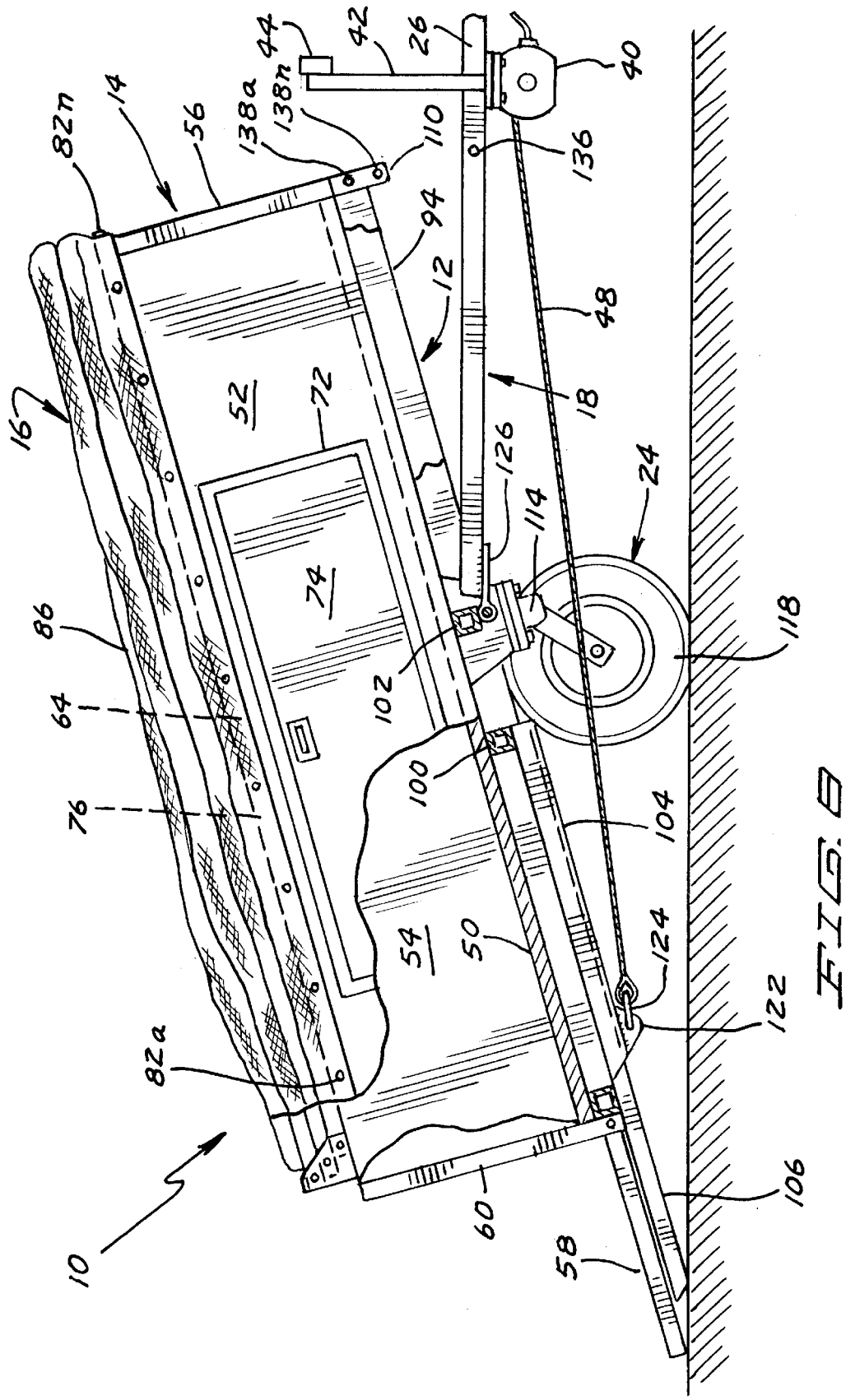

With reference to FIGS. 5, 6 and 7, the canopy assembly 16 is now described. The canopy assembly 16 is composed of three U-shaped metal framework members 88a–88c, as shown in FIG. 7, which are internally threaded through sewn-in sleeves in a canopy 86 made of canvas or other suitable material. The framework members 88a–88c are pivotally attached to two opposing mounting brackets 90 and 92 which are appropriately secured to the top edge of flanged lips 64 and 66 of the body assembly 14, nearest to the tailgate 58.

A plurality of snap fasteners on the canopy 86 and on the body assembly 14 are referenced herein using the same part numbers as they are essentially a two piece fastening means and are interchangeable. The canopy 86 is connected via snap fasteners 82a–82n to vertical portions 76, 78 and 80 of flanged lips 64, 66 and 68 of the body assembly 14. There is also a corresponding a series of snap fasteners 82a–82n which extend along three edges of the canopy 86. The canopy 86 is illustrated in the collapsed position where a series of retaining straps 84a–84n, which are appropriately secured to the vertical portions 76, 78 and 89 of body assembly 14, which hold the canopy 86 and the framework members 88a–88c secured to the body assembly 14 when traveling or not in use.

FIG. 2 illustrates a bottom view of the convertible trailer 10, where all numerals correspond to those elements previously or otherwise described. Illustrated in particular is the framework assembly 12 and wheel assemblies 22 and 24. The framework assembly is now described. The framework assembly is comprised of frame members 94 and 96, the tongue 26, an oversized frame member 104 and four cross members 98, 100, 102 and 103 which perpendicularly oriented with relation to the frame members 94 and 96, oversized frame member 104 and tongue 26. All of these frame members, excluding the tongue 26, are rigidly welded together as illustrated and the floor panel 50 is then secured thereto. Tongue 26 is mounted to cross member 102 by a tongue hinge 126 and held in place by a tongue receiver bracket 110, mounted to cross member 103, and a spring loaded pin 120. The purpose of the tongue hinge 126 and the tongue receiver bracket 110 will be further described in FIG. 3.

The wheel assemblies 22 and 24 are comprised of wheels 116 and 118 which are connected to torque-flex axles 112 and 114 which are secured to cross member 102 by means of mounting brackets 90 and 92. The torque-flex axles 112 and 114 provide enough support and stability for the trailer to easily handle a load weighing over a ton.

Oversized frame member 104 accommodates a ramp support 106 which slides freely on the interior of the oversized frame member 104 and is held in place by a spring loaded pin 108. The ramp support will be further described in FIG. 8.

Illustrated in particular is cable 48 which runs along the underside of tongue 26 and oversized member 104 and connects winch 40 to the rear end of the convertible trailer by means of a locking hook 124, such as but not limited to a carabiner, which is connected to a hook receiver 122 which is secured to the oversized frame member 104 near the tailgate 58. The purpose and use of winch 40 and the cable 48 will be further described in FIGS. 3, 5 and 6.

Also illustrated in FIG. 2 are is skid plate 30 and hinge 36 where wheels 32 and 34 are mounted. There are also provided tail lights 128 and 130 which are secured to the framework assembly 12 by means of mounting brackets 132 and 134 as illustrated in FIG. 1.

FIG. 3 illustrates a side view of the convertible trailer 10 in an intermediate stage of conversion, where all numerals correspond to those elements previously or otherwise described. Illustrated in particular is the separation of the tongue 26 with respect to tongue receiver bracket 110 when the spring-loaded pin 120, not illustrated, has been removed. Illustrated in particular is a hole 136 in tongue 26 and a plurality of holes 138a–138n in tongue receiver bracket 110. The plurality of holes 138a–138n in tongue receiver bracket 110 allow the height of the tongue 26 to be adjusted to the height of the tow vehicle. Cable 48 from winch 40 has been secured to hook receiver 122 via locking hook 124 and winch 40 reel in cable 48 which tilts the body assembly 14 and the canopy assembly 16 up and away from tongue assembly 12 which moves inwardly when the winch reels in cable 48. The bottom of tailgate 58 in contact with the ground acts the pivot point at which the body assembly 14 pivots. The skid plate 30 is released from retention pin 38 and pivoted about hinge 36. The skid plate 30 acts as a cover for coupler 28 and prevents obstructions from clogging the coupler 28. Wheels 32 and 34 are used to reduce friction between the ground and tongue 26, making it much easier for the tongue to move inwardly.

FIG. 4 illustrates a side view of the mode of operation of the skid plate 30 with wheel 32 removed, where all numerals correspond to those elements previously or otherwise described. Illustrated in particular is the path the skid plate 30 takes when released from retention pin 38. Wheel 32 has been removed to illustrate axle 35 which is appropriately secured to skid plate 30. Also illustrated is the fashion in which skid plate 30 acts as a cover for coupler 28. Wheels 32 and 34 can be removed so the skid plate 30 makes contact with the ground. This is done to reduce friction and ease movement on smooth or slippery surfaces, such as ice, where the wheels 32 and 34 slip.

FIG. 5 illustrates a side view of the convertible trailer 10 in an intermediate stage of conversion with the retaining straps 84a–84n removed, where all numerals correspond to those elements previously or otherwise described. Illustrated in particular is the automatic deployment of the canopy assembly 16 by means of two canopy brackets 140 and 142. The canopy 86 is supported by three U-shaped frame members 144a–144c which are pivotally secured to canopy brackets 140 and 142. The canopy brackets 140 and 142 are secured to flanged lips 64 and 66 which will be illustrated in FIG. 7. The U-shaped frame members 144a–144c are threaded through sleeves on the interior of canopy 86. When the winch 40 is further engaged, the tongue 26 is pulled inwardly, and the canopy assembly 16 is gravitationally deployed outwardly and downwardly.

FIG. 6 illustrates a perspective view of the convertible trailer 10 in a fully deployed position, where all numerals correspond to those elements previously or otherwise described. Illustrated in particular is the shape given to the canopy assembly 16 when fully deployed and the support provided by the tongue assembly 18 which prevents the convertible trailer 10 from tipping back in the wind or when bumped. Also illustrated in particular are three windows 146a–146c which can be open, screened or covered with transparent flexible plastic. There are also provided window covers 148a–148c which are fastened to the upper three sides of each window by Velcro, zippers or any other easily removable fastener. Window cover 148c is not illustrated for clarity.

When the convertible trailer 10 is fully deployed, it makes a suitable shelter for ice fishing and camping, for example. When the larger front window 146b is open and covered loosely by window cover 148b by pull-away fasteners, it provides ample space for hunters on the inside to view incoming game and easily pull away the window cover 148b for easy shooting of the game.

FIG. 7 illustrates a perspective view of the convertible trailer 10 in a fully deployed position with the canopy 46 removed, where all numerals correspond to those elements previously or otherwise described. Illustrated in particular are flanged lips 64–70, U-shaped frame members 144a–144c. The canopy 86 has been removed for purposes of clarity. Also illustrated is a shelf 150 which is gravitationally held in place by two internal brackets ,not shown, for storage when the canopy assembly 16 is fully deployed. The shelf 150 can easily be removed when not in use, and can be used to create a separate compartment in the bed of the trailer when used as a utility trailer.

FIG. 8 illustrates a side view in partial cut-away with the ramp support 106 deployed and the tailgate 58 acting as a loading ramp where all numerals correspond to those elements previously described. Illustrated in particular is the ramp support 106 in conjunction with the tailgate 58 acting as a durable loading ramp. Also illustrated is the configuration of the tongue hinge 126 with respect to the tongue assembly 18. This illustration assumes the coupler 28, not shown, is secured to the tow vehicle, adding support to the tongue assembly 18 when the loading ramp is used.

Various modifications can be made to the present invention without departing from the apparent scope hereof.

It is claimed:

1. A process for a trailer comprising the steps of:

a. cranking a crank on a trailer to cause the trailer to move from a horizontal position to a vertical position; and, b. causing a folded canopy to become unfolded during the cranking process.

\* \* \* \* \*